United States Patent [19]

Anderson

[11] Patent Number: 4,791,886
[45] Date of Patent: Dec. 20, 1988

[54] METHOD AND APPARATUS FOR RESTRAINING AN ANIMAL ON A VEHICLE

[75] Inventor: Edward A. Anderson, Houston, Tex.

[73] Assignee: E A Squared, Inc., Houston, Tex.

[21] Appl. No.: 71,485

[22] Filed: Jul. 9, 1987

[51] Int. Cl.⁴ ............................................. A01K 3/00
[52] U.S. Cl. ................................................. 119/120
[58] Field of Search .......................... 119/120, 109, 96

[56] References Cited

U.S. PATENT DOCUMENTS

| | | | |
|---|---|---|---|
| 3,004,519 | 10/1961 | Weissman | 119/120 |
| 3,189,003 | 6/1965 | Canfield | 119/120 |
| 3,203,399 | 8/1965 | Banks | 119/120 |
| 3,983,845 | 10/1976 | Roehrig | 119/120 |
| 4,252,084 | 2/1981 | Willow | 119/96 |
| 4,676,198 | 6/1987 | Murray | 119/109 |

FOREIGN PATENT DOCUMENTS

| | | | |
|---|---|---|---|
| 637344 | 2/1962 | Canada | 119/120 |
| 35387 | 4/1886 | Fed. Rep. of Germany | 119/120 |

*Primary Examiner*—Gene Mancene
*Assistant Examiner*—Cary E. Stone
*Attorney, Agent, or Firm*—Hubbard, Thurman, Turner & Tucker

[57] ABSTRACT

An animal restraining device for use on a vehicle cargo bed including a track member and a slider piece fitting within a slot in the track member is disclosed. A leash is connected to the slider member. The track is placed along and within a channel formed in the cargo bed such that an animal leashed to the slider member may roam the cargo bed but is restrained for leaving the cargo bed.

8 Claims, 1 Drawing Sheet

U.S. Patent
Dec. 20, 1988
4,791,886
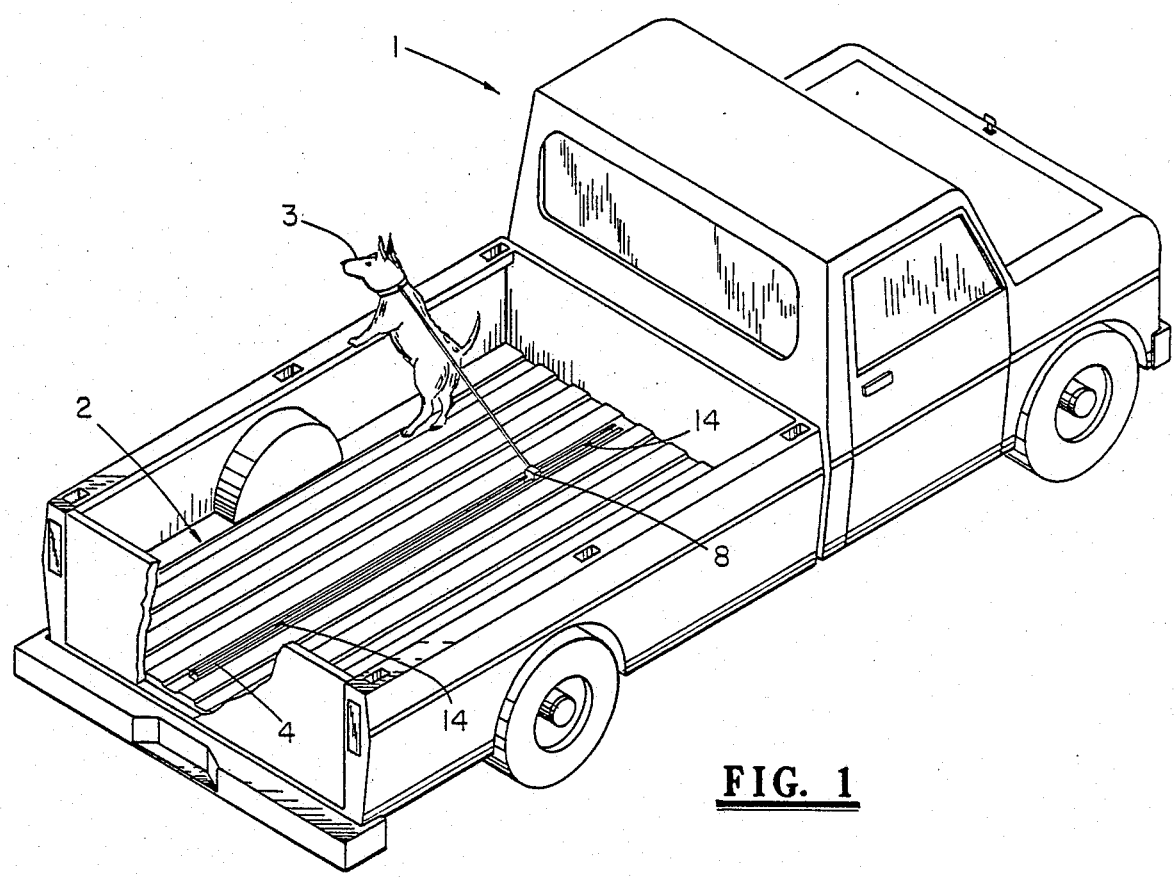
FIG. 1
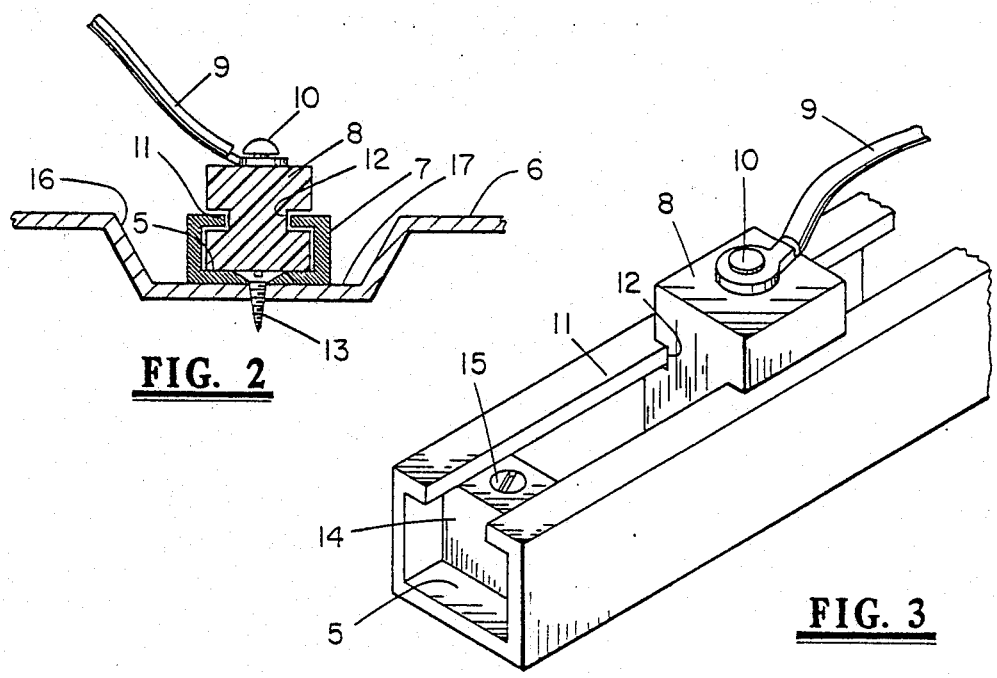
FIG. 2
FIG. 3

METHOD AND APPARATUS FOR RESTRAINING AN ANIMAL ON A VEHICLE

BACKGROUND OF THE INVENTION

1. Field of the Invention

This invention relates to a vehicle accessory allowing an animal to be safely transported on a vehicle cargo surface by a leash arrangement.

2. Description of the Prior Art

It is common for pet owners to transport their pets in the back of a vehicle while traveling down the roads and highways. Safety problems have arisen in that the pets sometimes jump out and are killed or hurt. Legislators have recognized the problem and it has been suggested to mandate the leashing of dogs in open vehicles. A fixed leash obviates the safety hazard but fails to provide freedom of movement often desired.

SUMMARY OF THE INVENTION

Apparatus and method are disclosed for leashing an animal to a vehicle cargo bed. A leash is attached to a sliding piece which fits within a slot in a track. While the vehicle is shown in FIG. 1 as a truck, the invention is also contemplated as being part of a trailer.

BRIEF DESCRIPTION OF THE DRAWINGS

FIG. 1 depicts a vehicle incorporating the track and slider to restrain an animal.

FIG. 2 is a cross sectional view of the vehicle cargo surface and the track and slider device.

FIG. 3 is a perspective view of the track and slider device and a stop device.

DETAILED DESCRIPTION OF THE PREFERRED EMBODIMENT

FIG. 1 depicts a vehicle 1 having a cargo bed 2. While the vehicle is shown in FIG. 1 as a truck, the invention is also contemplated as being part of a trailer. The cargo bed 2 typically has channels 16 formed therein. A slotted track member 7 is provided to lie within one of these channels 16. A central channel is preferable since it would give the animal the most freedom. The slotted track member 7 is secured to the floor of the channel 17 by conventional fasteners 13. A slider piece 8 fits within the slot 4 of the slotted track member 7 and is free to slide along the length of the slotted track member 7. The slider piece 8 has grooves 12 formed therein to facilitate engagement with the slotted track member as seen in FIG. 2. Attached to the slider piece 8 is a conventional swivel device 10 allowing free rotation of a leash or flexible strand 9 which is also attached to the swivel 10 as seen in FIG. 2. The flexible strand 9 may pivot 360° about the slider piece 8. The opposite end of the flexible strand 9 is attached to the collar or harness of an animal 3. Swivel 10 represents a snap-on connector connecting the leash to the slider to faciliate removal of the leash from the slider. A stop block 14 can be positioned within the slot of the slotted track member 7 at any desired point to prevent the slider from traveling beyond that point. More than one stop block 14 may be used to provide limits at each end of the slotted track member 7.

The slotted track member 7 is sized such that its height is no greater than the depth of a channel 16. Thus, it will not interfere with a flat load which is placed upon the cargo surface 2. Preferably, the top of the slotted track member would lie flush with the plane of the cargo surface 6.

Retention means or shoulders 11 are formed in the slotted track member 7 to prevent the slider from leaving the track 7. The shoulders 11 fit within grooves 12 formed in the slider 8. This arrangement allows free sliding motion of the slider along the direction of the longitudinal axis of the track 7 but provides restraint in all other directions.

Stop blocks 14 are provided to fit within the slot 4 of the slotted track member. Such stops may be used to limit the travel of the slider means. For example, a stop 14 is employed in FIG. 1 to prevent the animal 3 from jumping over the tailgate of the vehicle 1.

A stop may also be used to prevent the slider from leaving the track slot at the ends of the track 7. The stop may be secured to the track by any conventional fastener. Preferably, the stop block is threaded to receive a screw 15 which forces the stop 14 between the track floor 5 and the shoulders 11 as seen in FIG. 3.

The length of the leash or flexible strand 9 is selected and the position of the stop 14 is selected such that the animal is unable to jump over the sides or the tailgate of the vehicle bed 2.

Although the invention has been described in terms of the specified embodiment which is set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An animal restraining device incorporating a vehicle cargo surface comprising:
   a slotted track member extending along and within a channel formed in said cargo surface, the slotted track member being secured within the channel;
   slider means engagable within the slotted track member;
   retention means defined by the slotted track member for restraining the slider means from leaving the slotted track member in all directions except along the longitudinal axis of the slotted track member; and
   a flexible strand connected at one end to the slider means whereby the length of the strand is selected such that an animal attachable to the opposite end of the strand may roam the vehicle cargo surface but is prevented from leaving the vehicle cargo surface.

2. The device of claim 1 wherein the slotted track member is secured within the channel such that the height of the slotted track member is no greater than the depth of the channel.

3. The device of claim 1 wherein at least one stop means is selectively positioned within the slotted track means to prevent the slider mean from sliding beyond the stop means.

4. The device of claim 1 wherein the flexible strand is readily attachable and detachable from the slider means.

5. A method of restraining an animal on a vehicle cargo surface comprising the steps of:
   securing a slotted track member to a channel on the vehicle cargo surface;

providing a slider means for engaging the slotted track member such that the slider means may slide freely along the longitudinal axis of the slotted track member but is restrained from leaving the slotted track member in all directions except along the longitudinal axis of the slotted track member;

providing at least one stop means within the slot of the slotted track member such that the slider is prevented from passing beyond the stop means;

attaching one end of a flexible strand to the slider member and the opposite end to an animal; and selecting the length of the strand and the position of the stop means such that the animal is prevented from leaving the cargo surface.

6. The method of claim 5 including the step of sizing the slotted track member such that its height is no greater than the depth of the channel.

7. A device for restraining animals for use on a vehicle cargo surface comprising:

a slotted track member extending along and within a channel formed in the vehicle cargo surface, the slotted track member being secured to the channel such that the height of the slotted track member is no greater than the depth of the channel;

slider means for engaging the slotted track member, the slotted track member having shoulder means restraining the slider means such that the slider means is restrained from movement in all directions except along the longitudinal axis of the slotted track member;

stop means positioned within a slot of the slotted track member to limit the travel of the slider means;

a flexible strand connected at one end to the slider means;

whereby the length of the strand and the position of the stop means is selected such that an animal attachable to the opposite end of the flexible strand may roam the vehicle cargo surface but is prevented from leaving the vehicle cargo surface.

8. An animal restraining device incorporating a vehicle cargo surface comprising:

a slotted track member extending along and within a channel formed in said cargo surface, the slotted track member being secured within the channel;

slider means engagable within the slotted track member;

retention means defined by the slotted track member for restraining the slider means from leaving the slotted track member in all directions except along the longitudinal axis of the slotted track member, said retention means comprising shoulder means on the slotted track member engaging corresponding grooves on the slider means; and a flexible strand connected at one end to the slider means whereby the length of the strand is selected such that an animal attachable to the opposite end of the strand may roam the vehicle cargo surface but is prevented from leaving the vehicle cargo surface.

* * * * *